United States Patent

[11] 3,617,179

[72] Inventor Charles Edward Lewis
 Somerville, N.J.
[21] Appl. No. 888,921
[22] Filed Dec. 29, 1969
[45] Patented Nov. 2, 1971
[73] Assignee American Cyanamid Company
 Stamford, Conn.

[54] AMINOARYLAZOPYRIDINE OXIDE DYEING NICKEL MODIFIED POLYPROPYLENE FIBERS AND FIBERS SO DYED
8 Claims, No Drawings

[52] U.S. Cl. .................................................. 8/42 D,
 260/155
[51] Int. Cl. ...................................................... D06p 3/00
[50] Field of Search ........................................... 260/155;
 8/41, 42, 180, 31

[56] References Cited
UNITED STATES PATENTS
3,393,190 7/1968 Stright .......................... 8/42

Primary Examiner—Donald Levy
Attorney—John L. Sullivan

ABSTRACT: Nickel-containing polypropylene fibers and fabrics are dyed with azo dyes conforming to the formula:

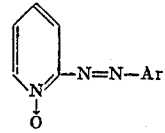

wherein Ar is an aryl radical containing a hydroxy group positioned ortho to the point of azo attachment and which may be further substituted with an amino, alkyl, alkylamino or dialkylamino group. A preferred dye is 2-hydroxy-1-naphthylazopyridine-1-oxide.

AMINOARYLAZOPYRIDINE OXIDE DYEING NICKEL MODIFIED POLYPROPYLENE FIBERS AND FIBERS SO DYED

The present invention relates to polypropylene dyeing. More particularly, it relates to an improved process for dyeing nickel-containing polypropylene fibers and fabrics utilizing a defined class of pyridine N-oxide azo dyes.

Polypropylene used for fibers and fabrics contains a variety of stabilizers to protect it from the damaging effects of heat and light. Among the light stabilizers frequently used are diverse nickel compounds, such as nickel salts of organic acids, nickel alcoholates and nickel chelates. Illustrative of such compounds are nickel acetate, nickel stearate, nickel alkoxides and nickel chelated with bis-(p-alkylphenol)monosulfide, 8-hydroxyquinoline, salicylaldoxime or o-hydroxybenzoacetophenone. The nickel stabilizers are present in stabilized polypropylene in amounts of from about 0.1 percent to about 10 percent, by weight, and usually from about 0.05 percent to about 1.0 percent.

In the past, these nickel-containing polypropylene fibers and fabrics have presented dyeing problems in that the dyes heretofore used have lacked sufficient affinity for the fibers whereby the dyed fibers lacked good lightfastness and resistance to dry cleaning, crocking and gas fading. There is, therefore, a need for dyes which exhibit good affinity for the fiber whereby these dyeing deficiencies are overcome. It is the object of the present invention to provide such dyes.

This object has been accomplished by the present invention whereby it has been found that certain pyridine N-oxide azo dyes exhibit excellent affinity for polypropylene fibers containing covalently held nickel.

The dyes of the invention conform to the formula:

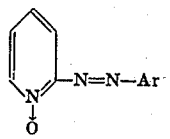

wherein Ar is an aryl moiety having a hydroxyl group positioned ortho to the point of azo attachment and which is otherwise unsubstituted or substituted with a group selected from an amino group, an alkyl group of 1–4 carbon atoms, an alkylamino group of 1–4 carbon atoms and a dialkylamino group in which each alkyl group contains 1–4 carbon atoms.

Representative of these dyes are: 2-hydroxynaphthylazopyridine-1-oxide, 2-hydroxy-5-methyl-1-naphthylazopyridine-1-oxide which are preferred as well as 2-hydroxy-5-dimethylaminonaphthyl azopyridine-1-oxide and 2-hydroxy-8-aminoaphthylazopyridine-1-oxide.

The dyes of the invention are readily prepared by coupling a diazotized 2-aminopyridine-1-oxide with an appropriate aryl compound in a suitable solvent, such as acetone, water or dimethylformamide. These dyes are characterized as one to four affinity for the nickel-containing polypropylene fiber one to four while at the same time exhibiting superior fastness to light, dry cleaning, one to four gas-fading.

The dyeing process is effected in an acid bath containing an inorganic or organic acid, such as sulfuric acid, phosphoric acid, sulfamic acid, formic acid or acetic acid, at a pH of about 2 to about 6 and, preferably, at a pH of about 3–4. Acetic acid is the acid of choice since it conveniently provides a pH of 3.5. The temperature may range from about 180° F. to about 212° F., a range from about 200° F. to about 205° F. being preferred, since, at boiling, the dye adheres too rapidly.

To facilitate the dyeing process, an anionic or nonionic surfactant may be added to the acid medium in amounts ranging from about 1 to 2 percent, based on the weight of dyestuff. Typical of such surfactants are sodium di(2-ethylhexyl)phosphate, sodium lauryl sulfate and nonylphenoxypoly(ethyleneoxy)ethanol.

The following examples will serve to further illustrate the invention. These are not to be taken as limitative. All parts are by weight unless otherwise stated.

EXAMPLE 1

Dyeing with 2-Hydroxy-1-naphthylazopyridine-1-oxide

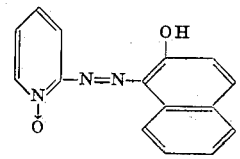

Procedure: To 5 parts (by volume) of acetone are added 0.025 part of a dye of the above formula prepared by coupling diazotized 2-aminopyridine-1-oxide to 2-naphthol. The resulting acetone solution is poured into 100 parts of water containing 1 part (by volume) of a 5 percent solution of a nonionic surfactant, which is a mixture of polyoxyethylene ether alcohol plus urea. The volume of the bath is brought to 200 parts (by volume) with water. To it is added 1 part (by volume) of a 5 percent solution of 56 percent sulfuric acid.

A 5-part sample of knit nickel-polypropylene fabric containing 0.05 percent nickel, is entered. The whole is heated to 200° F. and held at 200° F. for 1 hour.

The fabric dyes in 0.5 percent shade, is removed and scoured in boiling soap solution in which it shows no bleeding or shade change. It is dyed a violet due of good color value and excellent fastness.

Lightfastness rating is 6, corresponding to 80 hours stability to light in a carbon-arc FadeOmeter. A top rating fastness of 5 is obtained for dry cleaning test No. 85, for wet crocking and for gas-fading (3 cycles). Tests and rating scales are standard and given in the AATCC Technical Manual, Section 2, Colorfastness.

EXAMPLE 2

Dyeing with 2-Hydroxy-5-methyl-1-phenylazopyridine-1-oxide

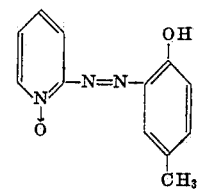

Procedure: To 5 parts (by volume) of acetone is added 0.025 part dye of the above formula prepared by coupling diazotized 2-aminopyridine-1-oxide to cresol and recrystallizing from methylcyclohexane. Two parts (by volume) of a 2½ percent solution of sodium dodecylbenzenesulfonate, an anionic agent, is added. The whole is diluted with 200 parts of water. To the bath is added 2 parts of a 5 percent solution of 28 percent acetic acid. A 5-part sample of knit nickel-polypropylene containing 0.05 percent nickel is entered. The nickel-polypropylene is dyed at 205° F. for 1 hour.

The dyes polypropylene is removed, rinsed and scoured as in example 1. It shows no bleeding with this treatment.

The polypropylene is dyed in 0.5 percent shade a navy blue of good color value. AATCC fastness tests on the dyed fiber show it to have a lightfastness rating of 4–5, dry cleaning 5, wet and dry crocking 4–5, and gas fading 4–5 after 3 cycles.

EXAMPLE 3

This example illustrates dyeing without the use of a surfactant.

Procedure: A 0.025 part sample of the dye of example 2 is dissolved in 200 parts of water to form a clear orange solution.

To it is added 3 parts (by volume) of a 5 percent solution of 28 percent acetic acid. A 5-part skein of nickel polypropylene containing 0.05 percent nickel is immersed in the bath and the dyeing carried out for 1 hour at 205° F. The skein, dyed a navy blue color, is removed from the bath, rinsed, scoured and dried. The skein, dyed in 0.5 percent shade, has a lightfastness rating of 5, and a rating of 5 for dry cleaning, crocking (wet and dry) and gas-fading, 3 cycles.

EXAMPLE 4

Dyeing with 2-Hydroxy-5-dimethylaminophenylazopyridine-1-oxide

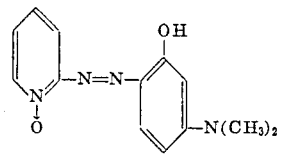

Procedure: When a dye of the above formula prepared by coupling diazotized 2-aminopyridine-1-oxide to *m*-dimethylaminophenol is dyed on nickel-polypropylene using the method of example 3, a red-brown of medium depth is obtained in 0.5 percent shade.

EXAMPLE 5

Dyeing with 2-Hydroxy-8-amino-1-naphthylazopyridine-1-oxide

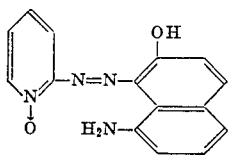

Procedure: A 0.025 part sample of a dyestuff of the above formula, prepared by coupling diazotized 2-aminopyridine-1-oxide to 8-amino-2-naphthol in dimethylformamide solvent, is dispersed in 200 parts of water by the addition of 5 parts (by volume) of a 5 percent solution of the nonionic agent nonylphenoxypoly(ehtyleneoxy)ethanol. To the bath is added 2 parts (by volume) of a 5 percent solution of 28 percent acetic acid. A 5-gram skein of nickel polypropylene containing 0.05 percent nickel, is entered and the whole heated for 1 hour at 205° F.

The dyed skein is removed from the bath, rinsed, scoured and dried. The 0.5 percent shade is a chocolate brown of medium depth.

Lightfastness rating is 5, dry cleaning (Test No. 85) is b 5, crocking 4–5, and gas-fading 4–5.

If 8-amino-2-naphthol is replaced by 8-methylamino-2-naphthol, the resulting dye provides a similar dyeing result.

Tests and ratings in the examples are standard and described in the AATCC Technical Manual, Section 2, Colorfastness.

I claim:

1. A process for dyeing nickel-containing polypropylene fibers and fabrics which comprises contacting the fiber or fabric with a compound of the formula:

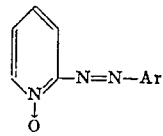

wherein Ar is an aryl moiety having a hydroxyl group positioned ortho to the point of azo attachment and which is substituted with a group selected from an amino group, an alkylamino group of one to four carbon atoms and a dialkylamino group in which each alkyl group contains one to four carbon atoms; in an aqueous bath having a pH of from 2 to 6 while maintaining the temperature of the bath at 180°–212° F.

2. The process of claim 1 wherein the compound is 2-hydroxy-5-dimethylaminophenylazopyridine-1-oxide.

3. The process of claim 1 wherein the compound is 2-hydroxy-8-amino-1-naphthylazopyridine-1-oxide.

4. The process of claim 1 wherein the pH is 3–4.

5. The process of claim 1 wherein the temperature of the bath is 200°–205° F.

6. The dyed product of claim 1.

7. The dyed product of claim 2.

8. The dyed product of claim 3.

* * * * *